United States Patent Office 2,808,436
Patented Oct. 1, 1957

2,808,436

PREPARATION OF MERCAPTOPROPIONIC ACIDS

Constantine E. Anagnostopoulos, Waltham, Mass., assignor to Monsanto Chemical Company, St. Louis, Mo., a corporation of Delaware No Drawing. Application December 31, 1953, Serial No. 401,722

6 Claims. (Cl. 260—535)

This invention relates to the preparation of hydroxy-mercaptopropionic acids. More particularly the invention relates to novel methods of preparing alpha-hydroxy-beta-mercaptopropionic acid and derivatives thereof.

It is a primary object of the invention to provide methods for the manufacture of hydroxy-mercaptopropionic acids and derivatives which are highly useful as additives to poultry feed compositions.

Still further objects and advantages of the invention will become apparent from the following description and appended claims.

According to the present invention the hydroxy-mercapto-propionic acids are prepared by reacting an inorganic disulfide with a hydroxy-chloropropionic acid, and subjecting the reaction mixture to reducing conditions. The process is preferably carried out by mixing a solution of an alkali metal disulfide, such as sodium or potassium disulfide, with alpha-hydroxy-beta-chloropropionic acid, allowing the resulting solution to react for at least five minutes at a temperature between 15 and 110° C., subjecting the reaction mixture to reducing conditions, and isolating the alpha-hydroxy-beta-mercaptopropionic acid which forms by any suitable method. By way of example, the process will be described in detail with respect to alpha-hydroxy-beta-mercaptopropionic acid and sodium disulfide.

The process is carried out by adding an aqueous solution containing 5 to 90% of sodium disulfide to an aqueous solution containing 5 to 80%, preferably 35 to 50%, of alpha-hydroxy-beta-chloropropionic acid which has previously been brought to a pH of about 7 by the addition of sodium carbonate or other alkali metal carbonate or hydroxide. Preferably a 5 to 25% molar excess of sodium disulfide is used. The addition of the disulfide is carried out at a temperature between 25 and 100° C., preferably between 40 and 50° C. The mixture is then heated to a temperature between 80 and 105° C. for 1 to 4 hours, preferably at a temperature between 90 and 100° C. for about 3 hours. The mixture is then made acidic, preferably to a pH of 5, by a slow addition of a mineral acid, such as sulfuric or hydrochloric acid. The mixture is then filtered to remove any solid matter which forms, and zinc is then added in portions, preferably in fine dust form, to the clear filtrate along with sufficient mineral acid to keep the reaction mixture acidic. After the addition of the zinc the mixture is filtered to remove any solids and the clear filtrate is extracted with ether. The ether extract is then dried and the ether is evaporated under vacuum preferbaly at an absolute pressure of 20 to 25 mm. of Hg. The oily residue which remains soon solidifies to crystalline alpha-hydroxy-beta-mercaptopropionic acid. However, crystallization does not always take place as in some instances the oily residue remains as an oil.

Instead of neutralizing the hydroxy chloropropionic acid by adding sodium carbonate to the aqueous solution, the acid may be only partly neutralized, or this step may be omitted entirely. However the best yields are obtained when at least 80 to 90% of the acid is neutralized. Instead of sodium carbonate any other alkali metal or alkaline earth metal salt or base, such as sodium hydroxide or calcium hydroxide, can be added in order to neutralize the acid partially or completely.

Instead of zinc other reducing agents can be used, such as tin or iron, or the reduction can be carried out by treatment with hydrogen in the presence of a suitable catalyst such as nickel, or the reduction can be carried out electrolytically.

Instead of extracting the reaction product from its aqueous solution by means of ether, other water-immiscible solvents can be used, if desired, such as chloroform, carbon bisulfide or the like. The hydroxy-mercaptopropionic acid can also be isolated by other methods, such as by passing the water solution of alpha-hydroxy-beta-mercaptopropionic acid through an ion-exchange resin, such as Dowex 50, to remove all metal cations and then eluting the resin, thereby obtaining separate solutions containing the organic and inorganic acids, after which the water is completely removed from the organic acid by evaporation under reduced pressure.

As a further alternative the hydroxy-mercaptopropionic acid can be precipitated from the aqueous solution in which it is prepared as the insoluble cuprous mercaptide by the addition of cuprous oxide. The acid can also be separated by adding an alkaline earth metal hydroxide or carbonate to the aqueous solution in which it is formed, after which it is precipitated as the alkaline earth metal salt by the addition of methyl or ethyl alcohol or by evaporation of the water to dryness. Suitable alkaline earth metal hydroxides or carbonates for this purpose include the hydroxides or carbonates of calcium, barium or magnesium.

Instead of adding the sodium disulfide solution to the aqueous solution of the hydroxy-mercaptopropionic acid, as described above, the propionic acid solution can be added to the sodium disulfide solution with equally good results. The procedure otherwise remains the same as hereinbefore described.

Having obtained the free alpha-hydroxy-beta-mercaptopropionic acid it is relatively simple to make certain derivatives of the acid including the ammonium salt, the alkali metal salts such as the sodium or potassium salt, and alkaline earth metal salts, such as the calcium, barium or magnesium salt. These derivatives are in general prepared by carefully neutralizing an aqueous solution of the alpha-hydroxy-beta-mercaptopropionic acid with the corresponding metal hydroxide or carbonate or ammonium hydroxide or carbonate. Isolation of the salts thus obtained can be effected by evaporating the aqueous solution to dryness under reduced pressure and preferably under an inert atmosphere, such as for example, nitrogen.

The compounds of this invention, which may be prepared as hereinbefore described, are primarily useful as additives to poultry feed compositions. Thus, in general it has been found that when small quantities of these compounds, e. g. from 0.005 to 1% by weight, based on the feed or ration, are incorporated in the feed, they tend to promote the growth of the poultry and/or to improve the efficiency of feed utilization by the poultry. The amounts of feed additive employed are dependent on the particular poultry feed composition used. In general, the preferred amounts range between 0.4 and 0.8% by weight, based on the weight of the entire feed composition.

A further understanding of the compounds of this invention and their preparation and use in feed compositions will be obtained from the following examples, in which the parts and percentages given are by weight unless otherwise specified.

EXAMPLE I

*Preparation of alpha-hydroxy-beta-mercaptopropionic acid*

A solution of sodium disulfide was prepared by heating to 90° C. for about 15 minutes a mixture of 48.5 grams of Na₂S·9H₂O (9.201 mol) and 6.5 grams of elementary sulfur. This mixture was then cooled to room temperature and added dropwise over a period of 15 minutes to a well stirred solution of 20 grams (0.161 mol) of alpha-hydroxy-beta-chloropropionic acid in 25 ml. of water. During the addition the reaction mixture rose from 27° C. to about 35° C. Halfway through the addition a yellow precipitate was formed which later redissolved. Stirring was continued for an additional hour and then the mixture was heated to about 75° C. and kept at this temperature for four hours. It was then cooled to 25° C and 18 ml. of 4 normal hydrochloric acid was added. A precipitate was formed which was filtered off. The clear filtrate was then heated to 95–100° C. and 10 grams of zinc dust were added gradually along with sufficient concentrated hydrochloric acid to maintain a pH of 2 to 3. The resulting mixture was filtered to remove any solids, cooled to room temperature and extracted continuously for 8 hours with diethyl ether. The ethereal extract was then dried over anhydrous sodium sulfate and the ether evaporated under an absolute pressure of 20 mm. of Hg. The thick oily residue upon cooling gave crystalline alpha-hydroxy-beta-mercaptopropionic acid having a melting point of 59–63° C. This acid was found to be soluble in water, ethanol, acetone, ethyl acetate and to a much less degree in chloroform and benzene, but insoluble in petroleum ether.

Calculated on the basis of the formula $C_3H_6O_3S$; C=29.50%, H=4.95%, S=26.25%. Found by analysis: C=29.5%, H=5.0%, S=26.6%.

The infra-red spectrum of the compound taken in mineral oil indicated the presence of hydroxy group (3.0 microns), sulfhydryl group (3.95 microns) and acid carbonyl group (5.9 microns).

Neutralization equivalent with sodium hydroxide gave a molecular weight of 125. The calculated value for $C_3H_6O_3S$ is 123.14.

EXAMPLE II

*Preparation of alpha-hydroxy-beta-mercaptopropionic acid*

A solution of sodium disulfide was prepared by dissolving 270 grams of Na₂S·9H₂O (1.125 mols) in 1000 ml. of water, adding 36 grams of sulfur (1.125 mols) and heating to reflux for one hour. To a solution of 188 grams of alpha-hydroxy-beta-chloropropionic acid (1.5 mols) in 500 ml. of water was added a total of 84 grams of anhydrous sodium carbonate to give a pH of about 7. This solution was then added dropwise over a period of 35 minutes to the previously prepared sodium disulfide solution which was maintained at 90–95° C. After the addition the mixture was held at reflux (104° C.) for three hours. It was then cooled to 25° C. and acidified by the addition of about 110 ml. of concentrated hydrochloric acid. A dark solid was formed and removed by filtration. The filtrate was boiled for 30 minutes under an absolute pressure of about 25 mm. of Hg and decolorized with carbon black. The pale amber solution remaining was then concentrated to a volume of 590 ml. by heating under reduced pressure. Reduction with zinc followed by ether extraction in the manner described in Example I gave a product which was found, by comparison of the infra-red spectra, to be identical with the alpha-hydroxy-beta-mercaptopropionic acid obtained in Example I.

EXAMPLE III

*Preparation of calcium alpha-hydroxy-beta-mercaptopropionate*

To a solution of 12.3 grams (0.1 mols) of alpha-hydroxy-beta-mercaptopropionic acid in 50 ml. of absolute ethanol were added 6 grams of calcium hydroxide and the mixture stirred and heated on the steam bath for about 10 minutes. Any excess calcium hydroxide was then filtered off and the clear alcoholic filtrate cooled to room temperature. Addition of ethyl ether caused a white precipitate to appear which was found to be calcium alpha-hydroxy-beta-mercaptopropionic acid.

Calculated on the basis of $(C_3H_5O_3S)_2Ca$ (molecular weight 284.36); Ca=14.09%. Found by analysis 14.2%.

The infra-red spectrum taken in mineral oil indicates hydroxy group (3.0 microns), sulfhydryl group (3.98 microns, very weak) and acid salt carbonyl group (6.2 microns, broad).

EXAMPLE IV

*Preparation of sodium alpha-hydroxy-beta-mercaptopropionate*

A solution of 6.1 grams (0.05 mols) of alpha-hydroxy-beta-mercaptopropionic acid in 25 ml. of water was brought to a pH of 7 by the careful addition of a 25% aqueous sodium hydroxide solution. Evaporation to dryness at an absolute pressure of about 12 mm. of Hg and under an atmosphere of nitrogen left a solid residue which upon washing with diethyl ether and drying was found to be sodium alpha-hydroxy-beta-mercaptopropionate. Calculated on the basis of $C_3H_5O_3SNa$ (molecular weight 146.14): Na=15.73%. Found by analysis 16.0%. The infra-red spectrum taken in mineral oil indicates hydroxy group (3.0 microns), sulfhydryl group (3.95 microns, very weak) and acid salt carbonyl group (6.2 microns, broad).

What is claimed is:

1. The method of preparing alpha-hydroxy-beta-mercaptopropionic acid which comprises mixing a solution of an inorganic disulfide with alpha-hydroxy-beta-chloropropionic acid, at a temperature between 15 and 110° C. subjecting the reaction mixture to reducing conditions, and isolating the alpha-hydroxy-beta-mercaptopropionic acid from the resulting solution.

2. The method of preparing alpha-hydroxy-beta-mercaptopropionic acid which comprises mixing an aqueous solution containing 5 to 90% of an alkali metal disulfide with an aqueous solution containing 5 to 80% of alpha-hydroxy-beta-chloropropionic acid, heating the resulting solution to a temperature between 15 and 110° C. for at least 5 minutes, subjecting the reaction mixture to reducing conditions, and then isolating the alpha-hydroxy-beta-mercaptopropionic acid formed.

3. The method of preparing alpha-hydroxy-beta-mercaptopropionic acid which comprises mixing an aqueous solution containing 5 to 90% of an alkali metal disulfide with an aqueous solution containing 5 to 80% of a substance selected from the group consisting of alkali metal and alkaline earth metal salts of alpha-hydroxy-beta-chloropropionic acid, heating the resulting solution to a temperature between 15 and 110° C. for at least 5 minutes, neutralizing the solution with mineral acid, subjecting the solution to reducing conditions, and isolating the alpha-hydroxy-beta-mercaptopropionic acid formed.

4. The method of preparing alpha-hydroxy-beta-mercaptopropionic acid which comprises mixing an aqueous solution containing 5 to 90% of an alkali metal disulfide with an aqueous solution containing 5 to 80% of a mixture of alpha-hydroxy-beta-chloropropionic acid and a substance selected from the group consisting of alkali metal and alkaline earth metal salts of alpha-hydroxy-beta-chloropropionic acid, heating the resulting solution to a temperature between 5 and 100° C. for at least 5 minutes, neutralizing the solution with mineral acid, subjecting the solution to pulverulent metal capable of oxidation, and then isolating the alpha-hydroxy-beta-mercaptopropionic acid formed.

5. The method of preparing alpha-hydroxy-beta-mercaptopropionic acid which comprises mixing an aqueous solution containing 5 to 90% of an alkali metal disulfide with an aqueous solution containing 5 to 80% of alpha-hydroxy-beta-chloropropionic acid, heating the resulting solution to a temperature between 15 and 110° C. for 1 to 4 hours, adding finely divided iron to the solution while maintaining the solution acidic, filtering the solution, and isolating the alpha-hydroxy-beta-mercaptopropionic acid formed.

6. The method of preparing alpha-hydroxy-beta-mercaptopropionic acid which comprises adding an aqueous solution containing 5 to 90% of an alkali metal disulfide to an aqueous solution containing 5 to 80% of alpha-hydroxy-beta-chloropropionic acid, heating the resulting solution to a temperature between 15 and 110° C. for 1 to 4 hours, adding zinc to the solution while maintaining the solution acidic, filtering the solution, and extracting the alpha-hydroxy-beta-mercaptopropionic acid from the filtrate with a water-immiscible solvent.

References Cited in the file of this patent

FOREIGN PATENTS

| | | |
|---|---|---|
| 180,875 | Germany | Feb. 19, 1907 |
| 194,039 | Germany | Jan. 13, 1908 |

OTHER REFERENCES

Richter: Organic Chemistry, vol. 1, p. 429; Elsevier Publ. Co., New York, 1934.